United States Patent
Kessler

[15] 3,696,797
[45] Oct. 10, 1972

[54] TRAVELING CHAMBER INTERNAL COMBUSTION ENGINE

[72] Inventor: Warren W. Kessler, 25 West Oneida Street, Oswego, N.Y. 13126

[22] Filed: Nov. 2, 1970

[21] Appl. No.: 86,920

[52] U.S. Cl..............................123/8.09, 123/8.47
[51] Int. Cl...............................................F02b 53/00
[58] Field of Search.....123/8.47, 18 R, 18 A, 149 H, 123/8.09

[56] References Cited

UNITED STATES PATENTS

| | | |
|---|---|---|
| 585,755 | 7/1897 | Haselwander.........123/149 H |
| 848,845 | 4/1907 | Paige........................123/8.47 |
| 3,483,578 | 12/1969 | Harrison...................123/8.47 |
| 3,500,798 | 3/1970 | Arnal........................123/8.47 |

Primary Examiner—Allan D. Herrmann
Attorney—Keith Misegades and George R. Douglas, Jr.

[57] ABSTRACT

A rotary chamber for an internal combustion engine in which the chamber is defined as formed between two variously rotating members essentially by pivotally disposed arms between fixed walls for forming a rotating or traveling chamber in which the compressing of air into atomized fuel is injected for combustion initiated by spark discharge, and in which the combustion propels one of the pivotal arms about its support shaft, while the other arm is temporarily fixedly held in place, and in which the cycling of the operation of the internal combustion engine is accomplished electronically.

5 Claims, 4 Drawing Figures

INVENTOR
WARREN W. KESSLER

BY George R. Douglas, Jr.
ATTORNEY

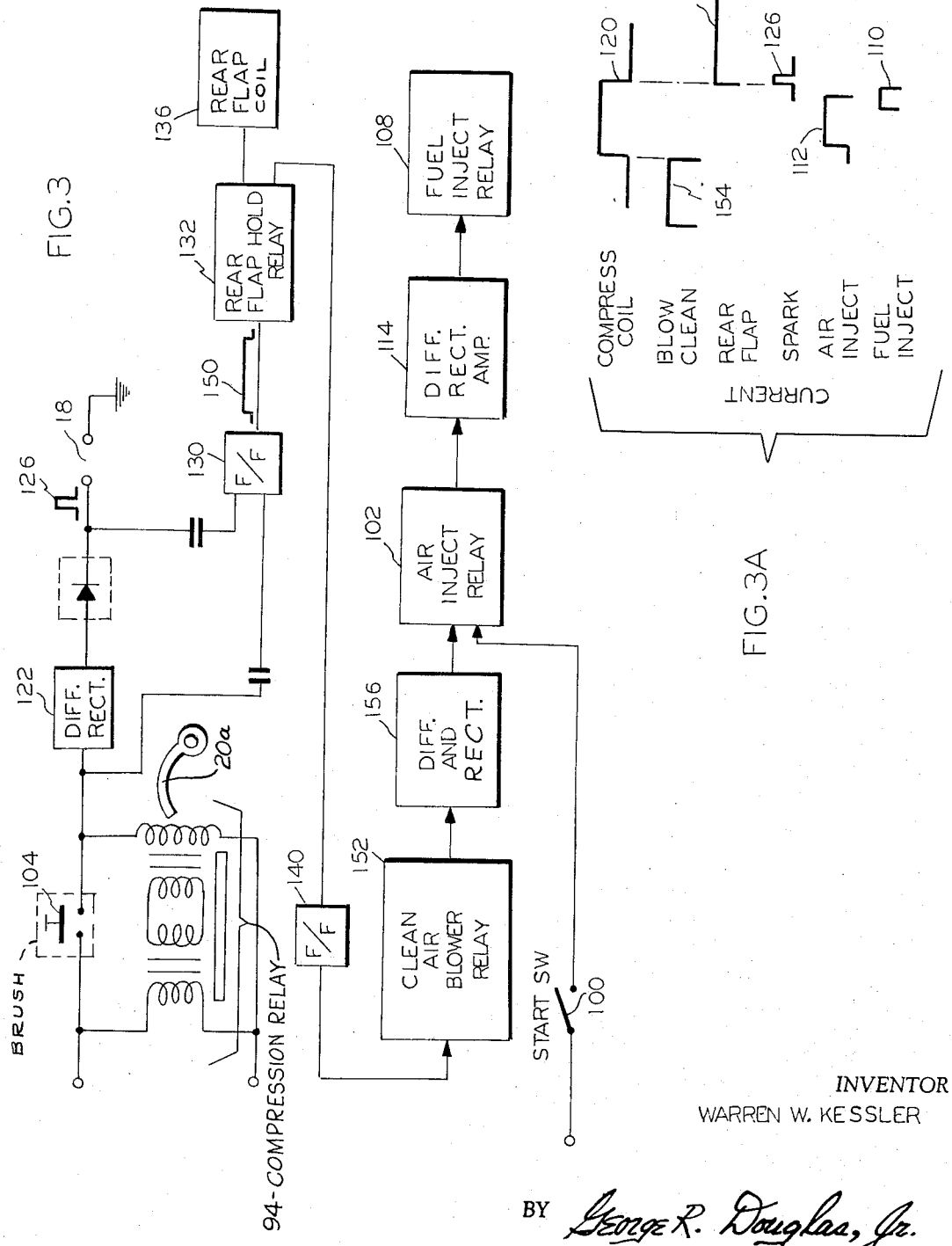

TRAVELING CHAMBER INTERNAL COMBUSTION ENGINE

BACKGROUND OF THE INVENTION

The present invention relates to rotary internal combustion engines, and more particularly the invention is directed to a traveling chamber, or an arrangement of radially disposed, pivotally connected chamber-forming plates, and in which the cycling of the stages or steps of internal combustion operation are initiated electronically.

More particularly, the present invention is related to a traveling chamber for an internal combustion engine that is constrained to move throughout a circular path, and in which the compression, explosion and exhaust stages of the internal combustion operation are actuated or regulated and controlled by electronic circuit means.

Rotary engines are any of various engines in which power is applied by revolving wheels, as in a turbine, or by cylinders, vanes or the like, constrained to move in a circular path.

An object, therefore, of the present invention is to provide a new, simplified, distinctive and uniquely functional cooperation between the electronic circuit control or regulation means and the radial movement of arms, vanes or plates forming the traveling chamber mounted on a centrally disposed shaft forming the internal combustion engine.

A further object and advantage of the invention is the provision for mounting ignition or spark gap means on either one or both of the movable vanes or plates forming the traveling chamber.

A further object of the invention is to provide an arrangement wherein one, more and a plurality of spark or ignition devices, fuel injection means and air injection means may be arranged throughout the circumference of the radial engine, within the purport and teachings of the present invention.

Another object of the invention is to provide a rotary internal combustion engine in which the force-arm of the effective center of the driven vane, the compression-expansion ratio, among other characteristics of the rotary internal combustion engine, are more than optimized over a typical internal combustion engine of the piston type.

A further object and advantage of the invention is that there are no cams, gears, exhaust valves, and other accouterments that are imposed upon piston-type internal combustion engines.

The present invention is an improvement over a conventional type Wankel engine and of various rotary internal combustion engines such as are exemplified in a patent to Ezbelent U.S. Pat. No. 1,860,707 and other patents found in the United States Patent Office's classification of patents found in Class 123, subclasses 8+, 43, 44 and 45, among others.

SUMMARY OF THE INVENTION

The invention, therefore, in general terms relates to means forming a traveling chamber for internal combustion engines, in which there is a centrally disposed shaft having a pair of distinctly rotatable members thereon forming front and rear portions of such traveling chamber, and disposed within side walls and an end wall or peripheral wall, which together may be circular or elliptical in nature, the forward member fixedly secured to the shaft and the follower member pivotally mounted on the shaft and provided with magnetic means for selectively or positionally holding it in place during periods of internal combustion, so that the forward member is, accordingly, driven by the effect of the internal combustion, and electromagnetic field means interacting with the forward and follower members for drawing them together during energization thereof, and providing for compression of media therein, whether it is gas, atomized fuel, or both, and a spark gap discharge means energized by the collapse of the electric field of the electromagnetic field means for igniting the air, atomized fuel, or both, in the compressed traveling chamber to produce products of combustion and expansion of the traveling chamber with minimum amount of pollution, and an electromagnetic solenoid mounted on at least one of said fixed side walls for engaging the follower member into a holding position during at least a portion of the cycle of internal combustion.

BRIEF DESCRIPTION OF THE DRAWINGS

The above and other objects and advantages of the invention will become apparent upon full consideration of the following detailed description and accompanying drawings in which:

FIG. 3 is a circuit and schematic ignition circuit diagram of the invention, according to operation of the invention under its preferred embodiment, and FIG. 3a shows current time diagrams involved in the operation of the invention.

DESCRIPTION OF THE PREFERRED EMBODIMENTS

Figure 1:
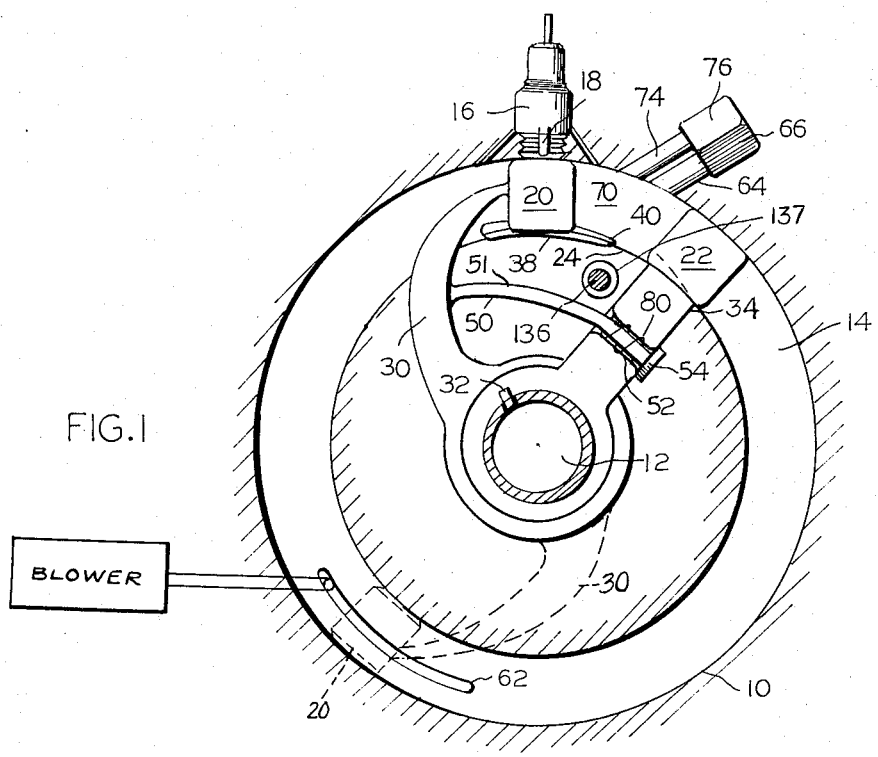
FIG. 1 is a side or end view of the rotary engine according to a preferred embodiment thereof.

Referring now to the drawings, there is shown a portion of a traveling chamber internal combustion engine 10 having a central shaft 12 and a circular, elliptical, or annular chamber 14 radially disposed about such shaft 12, and formed of a fixed peripheral wall with fixed integral side walls. At one location along the annual chamber 14, there is mounted a conventional type spark gap or spark plug device 16 so that the spark gap 18 is disposed slightly above the annular chamber 14, so that pistons 20, 22 may pass throughout the annular chamber 14 without engaging or contacting the spark gap 18 of the spark plug device 16.

Also provided in the annular chamber 14 is an inner disposed slot 24 between the fixed side walls that is radially oriented within the chamber 14. The piston 20 is mounted from a piston arm 30 that is supported centrally from the shaft 12.

The piston 22 is similarly disposed from an arm 34 also mounted on the shaft 12. The piston 22 is rigidly secured to the shaft 12 by key 32, or the like.

The radial arm 30 is shown disposed in an arcuate relation as it extends from the shaft 12 outwardly through the slot 24 and connects with the piston 20. This is to provide sufficient length or arc so that the slot 24 may be closed by the outer cover 38 if an outer chamber cover is used, and there is an inner cover 40 that covers the slot 24 within the chamber 14. The inner cover 40 may extend through an annular aperture 42 in the piston 22, and is of sufficient length to have at all times a portion of the inner cover 40 within the annular opening 42 through the entire length of the combustion and expansion portion of the cycle, to be described below. The pistons 20, 22 form the forward and aft partition walls for the traveling combustion chamber defined between these pistons in the chamber 14.

While pistons 20, 22 may freely rotate in a counterclockwise direction through the chamber 14, the piston 20 may never lead the piston 22 by length greater than the retaining arm 50 that extends from a mid-point of the radial arm 30 in an arcuate direction rearwardly, or clockwise, through a retaining aperture 52 in the radial arm 34. A head 54 is provided on the end of the arm 50 so that it is retained within the radial aperture 52. The arm 50 may have a magnetic material portion 51 and a non-magnetic or aluminum portion which connects with the head 54, resulting in the energization of the relay 80 attracting portion 51.

While there is disposed a spark plug device 16 at an upper or given portion of the rotary engine 10, the spark plug device 16 being shown mounted in a head plate or mounting 60, it is clear that the exhaust chamber 62 may be an arcuate exhaust port in a position that is useful to withdraw the products of combustion after the expansion cycle has occurred. While the pistons 20, 22 are in or are reaching their compression stage, to be described below, air may be injected through an injection pipe or nozzle 64 from an air cylinder 66. As the pistons 20, 22 are brought closer together by a relay mechanism, or the like, the traveling chamber 70 between the pistons 20, 22 becomes smaller so that the air is compressed, as in a conventional internal combustion engine. At a given predetermined time, fuel is then injected through a fuel nozzle 74 from a fuel cylinder 76, in a manner to be described by the system described below.

The chamber 70 is caused to be compressed by the compression relay 80.

Figure 2:
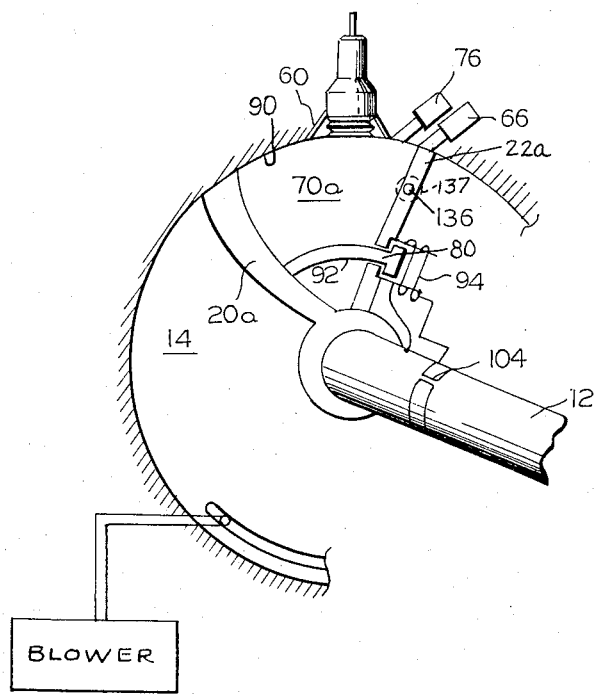
FIG. 2 is a side view of a modification or flapper type traveling chamber internal combustion engine, according to another preferred embodiment of the present invention.

FIG. 2 shows an axially mounted travelling compression chamber formed by a rear flap 22a and a lead flap 20a. The lead flap 20a is securely mounted onto the shaft 12, while the flap 22a is pivotally mounted on the same shaft. While the flaps 20a, 22a form the lead and rear portions of the traveling compression chamber 70a, the other walls are that of a cylinder end and a cylinder wall 90. In the cylinder wall 90, there may be the spark discharge device 16 having gaps 18, which spark plug device is disposed in a mounting 60. The rear flap 22a has a solenoid or compression armature 92 that is drawn by an electromagnetic device 94 when energized, resulting in the chamber 70a being substantially compressed. In the compressed condition and when it is desired to start the engine, a start switch 100 is closed to inject air through an air inject relay 102 into the compressed chamber 70a. At this point, it is assumed that the compression relay 80 has been energized by closure of a commutator switch 104 mounted on the shaft 12 so that when the flaps 20a, 22a are in a position approaching the spark gap device 16, the compression relay 80 actuates the electromagnetic device 94 to attract the armature 92 and thus reduce the size of the traveling chamber 70a, as is described above.

Thus, while the traveling chamber 70a has been compressed upon energization of electromagnetic armature 94, and upon closure of the start switch 100, the air inject relay 102 is energized to open the air cylinder 66 for communicating air into the traveling chamber 70a which is further compressed. Then, as is done in conventional internal combustion engines, fuel from a fuel cylinder 76 is released through a fuel inject relay 108 by a pulse 110, shown in FIG. 3A, as derived from the air inject pulse 112 as it passes through a differentiating rectifier amplifier 114.

At this point, the fuel and air in the traveling chamber 70a are ready for combustion, and this is accomplished by the opening of the commutator brush 104 on shaft 12, which causes the de-energization of compression relay 80, so that the wave form 120 in FIG. 3A is terminated, the termination portion of the wave being differentiated in a differentiator 122 and passed as a signal to the spark gap 18 in the form of a spark pulse 126 (FIG. 3A). This may be a relatively sharp pulse, as is well known in electronic ignition technique. The pulse 126 is also passed through a two state flip-flop or multivibrator circuit 130 so that a pulse is passed to release a rear flap hold relay 132 that holds the rear flap 22a in position, which in turn energizes a rear flap armature 136 when rear flap coil 137 is energized for holding flap 22a in place due to the electromagnetic field force of the armature attracting and holding the flap 22a by acting on its magnetic properties. The armature 136 holds the rear wall of the traveling chamber 70a in place so that as the expansion stage takes place, the piston 20 or the flap 20a, as the case may be, will have a reference point to move from as the traveling chamber expands and thus motivates rotation of the shaft 12 in a counterclockwise direction.

When the operation of the rotary engine had commenced, a signal is taken from the de-energization rear flap hold relay and passed through a flip-flop or multivibrator or differentiator network 140 for the purpose of using the de-energization portion of the pulse 150 to accordingly actuate a clean air blower relay 152 to provide for the passing of clean air into the chamber 14 of the rotary engine 10. The relay 152 is provided with sufficient delay so that it is energized during the length of the pulse 154, and then cuts off. The de-energization of the pulse 154, being passed through a differentiator and rectifier circuit 156, then provides energization of the air inject relay 102 and starts the air inject pulse 112, and thus the cycle for operation of the rotary engine 10 is completed through a complete cycle of rotation.

The shaft 12 may be coupled to a torque converter means (not shown), then to wheels of the vehicle that is driven by the internal combustion engine. The torque converter is used to smooth the rotation characteristics of the resulting rotational power and may include any desired fly wheel means (not shown).

Additional embodiments of the invention in this specification will occur to others and, therefore, it is intended that the true spirit of the invention be limited only by the appended claims and not by the embodiment described hereinabove. Accordingly, reference should be made to the following claims in determining the true spirit of the invention.

WHat is claimed is:

1. A traveling chamber, rotary internal combustion engine comprising a rotary engine mounted about a central rotating shaft, a forward means and a follower means each mounted on said shaft defining a traveling chamber within said rotary engine, said forward means fixedly secured to said shaft and said follower means pivotally mounted from said shaft, a projection arm extending from said forward means and inter-engaging with the follower means, electrical components including electromagnetic field means for interacting with the projecting arm to compress the traveling chamber when energized, an electromagnetic solenoid mounted to engage the follower means into a holding relation, means for introducing air and fuel into the compressed traveling chamber, spark gap discharge means energized by collapse of the electric field of said electromagnetic field means to ignite the air and fuel in the compressed traveling chamber to produce products of combustion and expansion of the traveling chamber, and a two-state, flip-flop means responsive to the pulse applied to the spark discharge means for maintaining energization of said electromagnetic solenoid to hold the said follower means.

2. The invention according to claim 1 wherein means are provided to inject clean air from a blower before to the compression of the traveling chamber for cleaning the chamber.

3. The invention according to claim 2 wherein the cycle of energization of the electrical components is repetitive, so that the sequence is provided wherein a spark discharge initiates a two-state device for the follower means being held in place until de-energized, which in turn actuates a clean air blower relay, which in turn upon de-energization energizes a compression stage of the traveling chamber, and simultaneously energizes air injection for a portion of the compression stage, and in which fuel is injected during the remainder of said portion of the compression stage, and upon completion of the compression stage a spark is developed from the termination of the compression stage for combustion of products within the traveling chamber.

4. The invention according to claim 1 wherein the forward and the follower means are piston elements in an annular cavity disposed about said shaft.

5. The invention according to claim 1 wherein said forward and follower means are shaft-mounted flap elements forming said traveling chamber.

* * * * *